Figure 1:
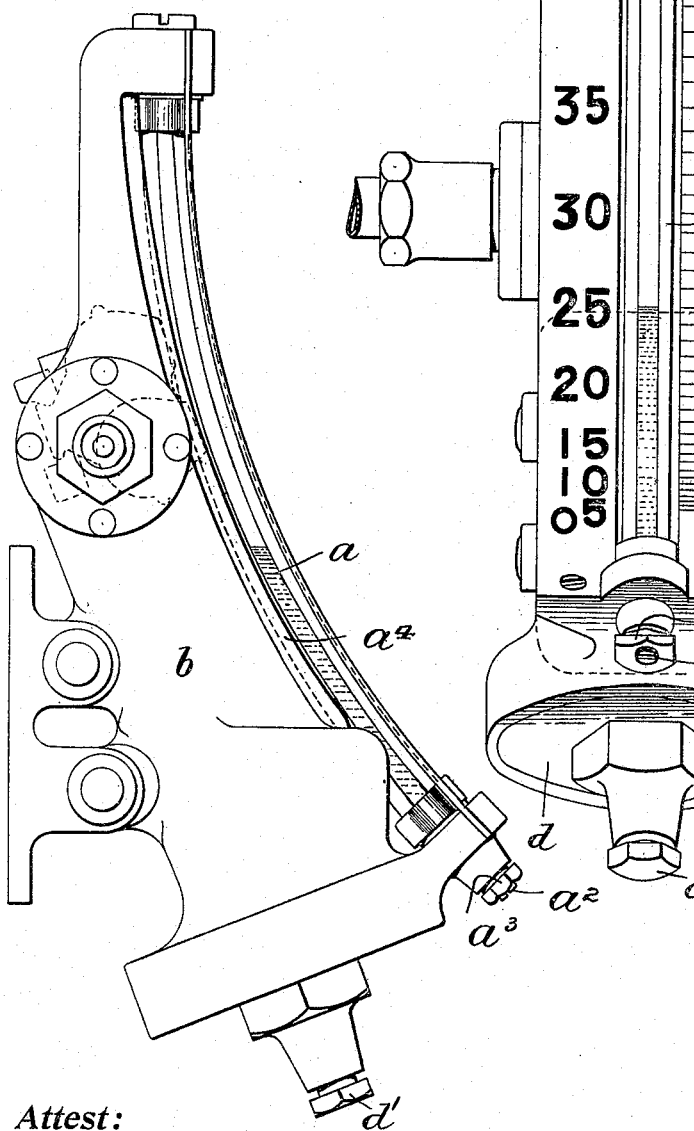

C. H. VEEDER.
MEASURING OR INDICATING INSTRUMENT.
APPLICATION FILED JUNE 30, 1906.

937,015.

Patented Oct. 12, 1909.
2 SHEETS—SHEET 1.

Attest:
Edgeworth Greene
G. McGrann.

Inventor:
Curtis Hussey Veeder
by Redding, Kiddle & Greeley
Attys.

C. H. VEEDER.
MEASURING OR INDICATING INSTRUMENT.
APPLICATION FILED JUNE 30, 1906.
937,015.
Patented Oct. 12, 1909.
2 SHEETS—SHEET 2.
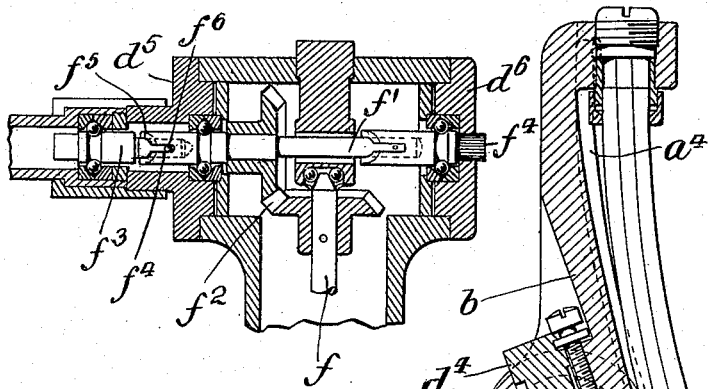
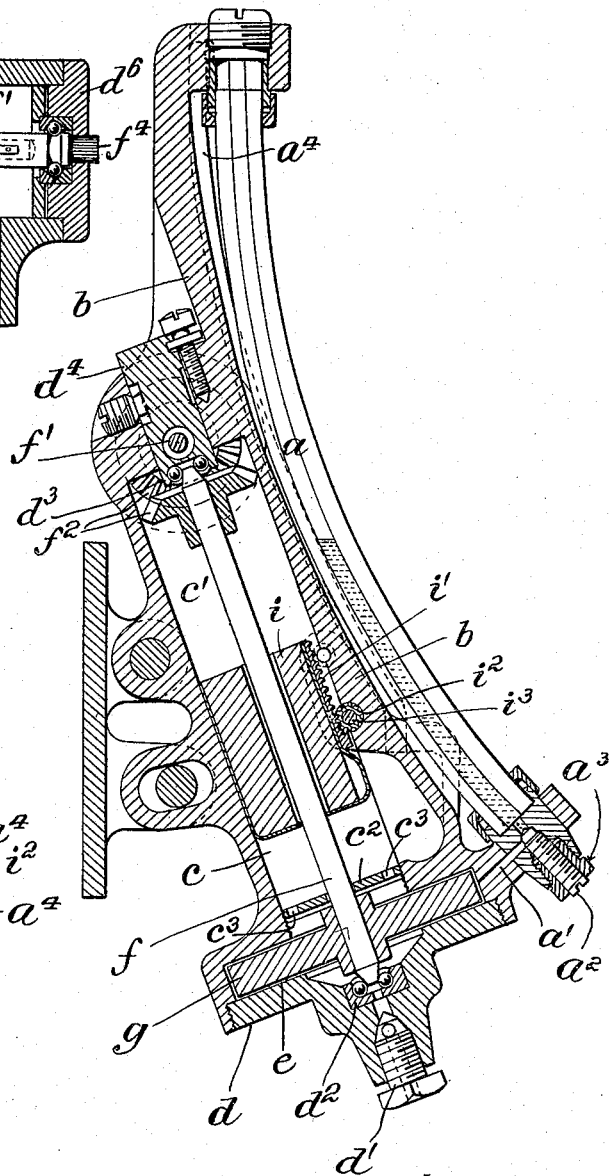
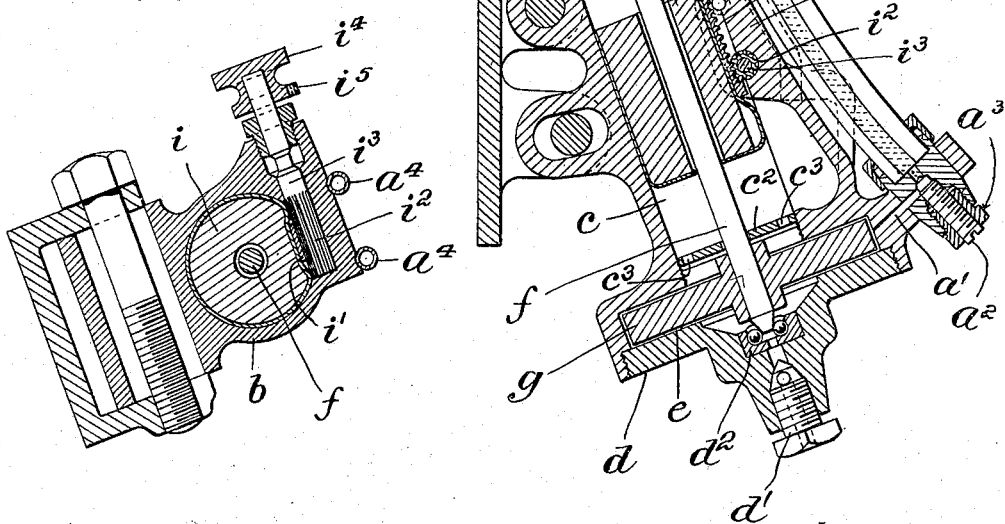

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

MEASURING OR INDICATING INSTRUMENT.

937,015.  Specification of Letters Patent.  Patented Oct. 12, 1909.

Application filed June 30, 1906. Serial No. 324,167.

*To all whom it may concern:*

Be it known that I, CURTIS HUSSEY VEEDER, a citizen of the United States, residing in Hartford, in the State of Connecticut, have invented certain new and useful Improvements in Measuring or Indicating Instruments, of which the following is a specification, reference being had to the accompanying drawings, forming a part hereof.

This invention relates particularly to instruments which are adapted to show the speed of rotation and the number of rotations of a rotating body such as a driving shaft, or the speed of rotation alone.

The invention has been developed with special reference to its application to motor vehicles, the improved instrument being adapted to show the speed of the vehicle and, if desired, to show in addition the distances traveled.

The object of the invention is primarily to improve the construction of speed indicating devices for the purpose of overcoming difficulties which have been experienced hitherto in the use of devices of a similar character and for the purpose of making the instrument more simple, compact and convenient both for application and for observation and, furthermore, to enable the distance recording instrument to be directly combined with the speed indicating instrument and driven by the same means.

The speed indicating devices are of the general character of those shown in Letters Patent of the United States Nos. 732,975 and 733,358 both dated July 7, 1903, in which the speed is indicated by the varying height of a column of liquid as affected by the speed of rotation of a paddle wheel, but in the improved instrument there is no stuffing box below the level of the liquid in the reservoir, the paddle wheel is driven and the displacement plunger is operated from above the surface of the liquid in the reservoir, the free surface of the liquid in the reservoir is vertically or nearly so under the surface of the liquid in the indicating column when in its average or running position so that the indication of the instrument is not affected by any ordinary inclination of the motor vehicle in going up or down hill, the odometer or distance indicating device is applied directly to the casing of the tachometer or speed indicating device and is driven by the same shaft and the entire instrument is more compact and simple in construction.

The invention will be more fully described hereinafter with reference to the accompanying drawings, in which it is illustrated as embodied in a convenient and practical form and in which—

Figure 2:
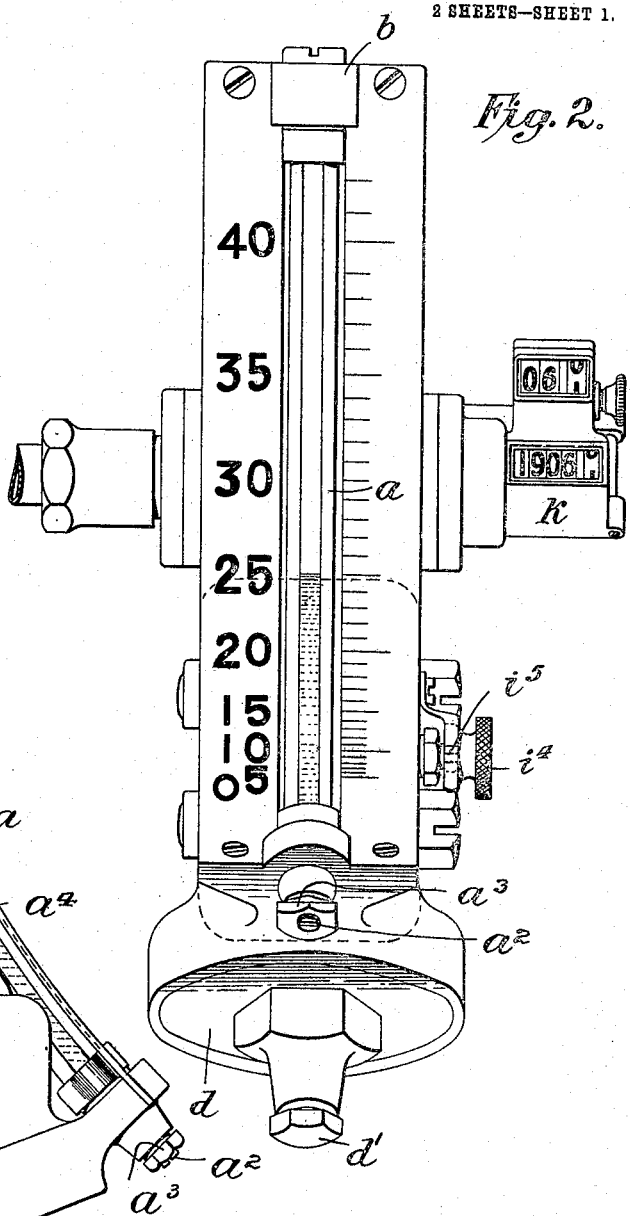

Figure 1 is a view in side elevation of the improved instrument. Fig. 2 is a view thereof in front elevation. Fig. 3 is a view thereof in vertical central section. Fig. 4 is a detail view in vertical central section on a plane at right angles to that of Fig. 3, showing particularly the driving mechanism, and Fig. 5 is a detail view in transverse section illustrating particularly the displacement plunger.

In the embodiment of the invention shown in the drawings the glass indicator tube $a$ is preferably curved because the instrument is thus more easily read from a point above its level than if the tube is vertical, and because the spacing of the scale at the bottom may thereby be increased. It is secured at its upper and lower ends in a suitable support $b$ which also contains in its lower portion, vertically beneath the lower portion of the tube $a$, a reservoir $c$ with which the tube $a$ communicates through a channel $a'$ and a pump chamber $e$. When the top of the column of liquid in the tube $a$ stands in its average or usual running position, it is then vertically over the free surface of the liquid in the reservoir $c$, so that the height of the liquid in the tube is not materially affected by ordinary changes in the inclination of the instrument, as when the motor vehicle to which it is applied is going up or down hill. Means are provided such as a screw $a^2$ working in a gland $a^3$ in the bracket which supports the lower end of the indicator tube $a$, for the purpose of choking the passage from the pump chamber to the indicator tube to prevent dancing of the liquid in the tube. The return pipes $a^4$ connect the top of the tube $a$ with the top of the reservoir $c$ so as to return the liquid to the reservoir if the speed is great enough to force it out of the top of the indicator tube and so as to maintain the balance of pressure on the liquid in the indicator tube and on that in the reservoir.

The reservoir $c$ and pump chamber $e$ form part of the main chamber within the support $b$, the upper portion $c'$ of such chamber being extended upwardly with a substantially cylindrical cross section. The lower end of the chamber $c\ c'\ e$ is closed by a screw cap $d$ which is provided with a drainage plug $d'$. The shaft $f$ which carries and drives the pump or paddle wheel $g$, is extended axially and nearly vertically through the chamber $c\ c'\ e$ and is mounted in suitable bearings $d^2$, in the cap $d$, and $d^3$, in a plug $d^4$ which is adjustably mounted in the upper end of the support or casing. In suitable lateral heads $d^5\ d^6$ in the upper portion of the support or casing, is mounted a short horizontal shaft $f'$ geared to the shaft $f$ by bevel gears $f^2$, and coupled at one end, as at $f^3$, to the usual flexible driving shaft by which movement is transmitted from the vehicle to the pump or paddle wheel $g$ of the measuring instrument.

The displacement plunger $i$ is located in the cylindrical portion $c'$ of the chamber $c\ c'$, above the reservoir $c$, and is provided on one side with a rack $i'$ which is engaged by a pinion $i^2$ formed on a shaft $i^3$. The latter is mounted in suitable bearings in the support or casing $b$ and is provided externally with a suitable knob $i^4$ by means of which the displacement plunger $i$ for varying the level of the liquid in the reservoir may be raised and lowered. It will be observed that the shaft $i^3$ is located wholly above the reservoir $c$, so that, as the shaft $f$ is axial and driven from above, there is no stuffing box in the instrument below the surface of the liquid in the reservoir to create friction and so increase the power to drive the apparatus, it being highly desirable to reduce as much as possible the strain and consequent wear on the flexible driving shaft and gears. The knob $i^4$ may be provided with a toothed detent $i^5$ to prevent accidental movement of the plunger $i$.

It is found that when the reservoir $c$ communicates directly with the pump chamber $e$ and throughout the full diameter of the reservoir, eddy currents or swirls are created in the liquid in the reservoir by the revolution of the paddle, so that the indications of the liquid column in the tube $a$ vary somewhat according to the distance of the plunger $i$ from the paddle $g$, the body of liquid in which the eddy currents or swirls are set up being varied accordingly. To prevent the formation of such eddy currents or swirls a disk $c^2$, perforated as at $c^3$, is interposed between the reservoir $c$ and the pump chamber $e$. This disk $c^2$ also forms a stop to limit the downward movement of the plunger $i$, the upward movement being limited by contact of the end of the rack $i^7$ with the pinion $i^2$.

As pointed out hereinbefore, the distance measuring device may be directly combined with the speed measuring device, in one structure. As shown in Fig. 2 of the drawings an ordinary odometer $k$, the construction of which is as usual, and need not be explained herein, is secured directly to the support or casing $b$ or to the head $d^6$ thereof and is driven by the extended end $f^4$, shown in Fig. 4, of the shaft $f'$. Not only are the speed measuring and the distance measuring devices thus placed in convenient proximity, but they are driven together through a common driving mechanism from the wheel of the vehicle or other rotating body, the speed of rotation and the number of rotations of which are to be shown.

In order that driving engagement of the flexible driving shaft, represented at $f^3$, with the shaft $f'$ may be readily effected, the socket indicated at $f^4$ in the shaft $f'$ is beveled off on each side, as at $f^5$, so that the driving pin $f^6$ is practically certain to enter the slot in the shaft.

It will be obvious that details of construction and arrangement of the improved instrument may be varied to suit different conditions and that the invention is not limited to the precise construction shown.

I claim as my invention:

1. In a speed measuring instrument, the combination of a support or casing, a liquid reservoir and a curved indicating tube, a paddle wheel between said reservoir and indicating tube and driving mechanism for said paddle wheel, the lower portion of said reservoir being located substantially vertically below the lower portion of the indicating tube, whereby the height of the liquid in the tube is not affected by ordinary changes in inclination of the instrument.

2. In a speed measuring instrument, the combination of a support or casing, a liquid reservoir and speed indicating tube, said reservoir having an upward extension, a paddle wheel between said reservoir and indicating tube, driving mechanism for said paddle wheel, a displacement plunger movable in said extension of the reservoir, and means projecting externally of the support or casing above the reservoir for shifting said plunger.

3. In a speed measuring instrument, the combination of a support or casing, a liquid reservoir having an upward extension and a speed indicating tube, a paddle wheel, driving mechanism for said paddle wheel, a displacement plunger movable in said extension above the reservoir and provided with a rack, and a shaft and pinion located in the wall of said support or casing above the reservoir for operative engagement with said rack.

4. In a speed measuring instrument, the combination of a support or casing, a liquid reservoir and speed indicating tube, a paddle wheel, driving mechanism for said paddle wheel, and a perforated plate interposed between the reservoir and the paddle wheel to prevent the formation of swirls in the reservoir.

This specification signed and witnessed this 21st day of June, A. D., 1906.

CURTIS HUSSEY VEEDER.

Signed in the presence of—
E. BARRIE SMITH,
E. G. BIDDLE.